(12) United States Patent
Zhang et al.

(10) Patent No.: US 12,131,506 B2
(45) Date of Patent: Oct. 29, 2024

(54) METHOD AND APPARATUS FOR CONSTRUCTING A 3D GEOMETRY

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 513 days.

(21) Appl. No.: 17/501,779

(22) Filed: Oct. 14, 2021

(65) Prior Publication Data
US 2022/0284633 A1    Sep. 8, 2022

Related U.S. Application Data (60) Provisional application No. 63/157,519, filed on Mar. 5, 2021.

(51) Int. Cl.
*G06T 9/00*      (2006.01)
*G06T 17/00*     (2006.01)

(52) U.S. Cl.
CPC ............. *G06T 9/001* (2013.01); *G06T 17/00* (2013.01); *G06T 2210/12* (2013.01); *G06T 2210/56* (2013.01)

(58) Field of Classification Search
CPC ...... G06T 9/001; G06T 17/00; G06T 2210/12
See application file for complete search history.

(56) References Cited

U.S. PATENT DOCUMENTS

| | | | |
|---|---|---|---|
| 2005/0091234 A1* | 4/2005 | Hsu | ................... G06F 16/90344 |
| 2014/0351549 A1* | 11/2014 | Harris | ................... G06F 3/0673 |
| | | | 711/171 |

(Continued)

FOREIGN PATENT DOCUMENTS

| | | |
|---|---|---|
| EP | 4022456 A1 | 7/2022 |
| EP | 4031907 A1 | 7/2022 |

OTHER PUBLICATIONS

Rufael Mekuria, et al.; "Requirements for Point Cloud Compression"; International Organisation for Standardisation; ISO/IEC JTC1/SC29/WG11; Coding of Moving Pictures and Audio; Feb. 2016; Geneva CH; 3 pgs.

(Continued)

*Primary Examiner* — Phi Hoang
(74) *Attorney, Agent, or Firm* — ArentFox Schiff LLP (57) ABSTRACT

Aspects of the disclosure include methods, apparatuses, and non-transitory computer-readable storage mediums for point cloud compression. An apparatus includes processing circuitry that encodes information associated with a current point of a plurality of points of a point cloud. The plurality of points is partitioned into multiple bounding boxes. The processing circuitry determines whether a first size of a hash table is greater than or equal to a predetermined maximum size of the hash table. The processing circuitry removes information associated with non-boundary points in the multiple bounding boxes from the hash table based on the first size of the hash table being greater than or equal to the predetermined maximum size of the hash table. The processing circuitry stores the encoded information associated with the current point into the hash table.

20 Claims, 11 Drawing Sheets

---

Algorithm 1:

Initialization: empty hash table H, K=maxHashSizeLog2, M=hashBoundarySizeLog2;

for each point $p$ in point cloud:

if $H.size() \geq 2^K$:

remove all non-boundary elements in H;  // hash shrinking

Insert p into H;

(56) References Cited

U.S. PATENT DOCUMENTS

| | | | |
|---|---|---|---|
| 2019/0156520 A1 | 5/2019 | Mammou et al. | |
| 2019/0197739 A1* | 6/2019 | Sinharoy | G06T 9/00 |
| 2019/0379912 A1* | 12/2019 | Su | H04N 19/136 |
| 2019/0385355 A1 | 12/2019 | Xu | |
| 2020/0413096 A1 | 12/2020 | Zhang et al. | |
| 2021/0213973 A1* | 7/2021 | Carillo Pena et al. | G06N 3/044 |
| 2021/0314221 A1* | 10/2021 | Hong | H04L 41/0816 |
| 2021/0407139 A1* | 12/2021 | Graziosi | H04N 19/136 |
| 2022/0050816 A1 | 2/2022 | Zhang et al. | |
| 2022/0207780 A1* | 6/2022 | Ramasubramonian | H04N 19/1883 |
| 2023/0048381 A1* | 2/2023 | Taquet | G06T 9/40 |

OTHER PUBLICATIONS

Christian Tulvan, et al.; Use Cases for Point Cloud Compression (PCC); International Organisation for Standardisation; ISO/IEC JTC1/SC29/WG11; Coding of Moving Pictures and Audio; Jun. 2016; Geneva, CH; 8 pgs.

Khaled Mammou, et al.; "G-PCC Codec Description v2"; International Organisation for Standardisation; ISO/IEC JTC1/SC29/WG11; Coding and Moving Pictures and Audio; Jan. 2019; Marrakech, MA; 40 pgs.

Information Technology—MPEG-I (Coded Representation of Immersive Media)—Part 9: Geometry-Based Point Cloud Compression; CD Stage; ISO/IEC 23090-9:2019(E); ISO/IEC JTC 1/SC 29/WG 11; Secretariat: JISC; 2019; 104 pgs.

International Search Report and Written Opinion issued Jan. 25, 2022 in International Patent Application No. PCT/US21/55406, 15 pages.

Xu Yi et al: "Multi-scale Voxel Hashing and Efficient 3D Representation for Mobile Augmented Reality", 2018 IEEE/CVF Conference on Computer Vision and Pattern Recognition Workshops (CVPRW), IEEE, Jun. 18, 2018, pp. 1586-1593.

Supplementary European Search Report issued May 19, 2023 in Application No. 21927034.5, pp. 1-12.

* cited by examiner

Algorithm 1:

Initialization: empty hash table H, K=maxHashSizeLog2, M=hashBoundarySizeLog2;

for each point $p$ in point cloud:

if $H.size() \geq 2^K$:

remove all non-boundary elements in H;   // hash shrinking     insert $p$ into H;

FIG. 5

```
Algorithm 2:

Initialization: empty hash table H, K=maxHashSizeLog2, M=hashBoundarySizeLog2;

checkpoint = {0, 0, 0};

for each point p in point cloud:

if {p.x >> M, p.y >> M, p.z >> M} != checkpoint:

if H.size() ≥ 2^K:

remove all non-boundary points in H;   // hash shrinking checkpoint = {p.x >> M, p.y >> M, p.z >> M};

insert p into H;
```

*FIG. 6*

```
Algorithm 3:
Initialization: empty hash table H, K=maxHashSizeLog2, M=hashBoundarySizeLog2;
checkpoint = {0, 0, 0};
for each point p in point cloud:
    if {p.x >> M, p.y >> M, p.z >> M} != checkpoint:
        if H.size() ≥ 2^K:
            remove all non-boundary points in H;  // hash shrinking
        checkpoint = {p.x >> M, p.y >> M, p.z >> M};
    if H.size() ≥ 2^K:
        remove all points in H;  // hash shrinking
    insert p into H;
```

FIG. 7

Algorithm 4:

Initialization: empty hash table H, K=maxHashSizeLog2;

for each point $p$ in point cloud:

if $H.size() \geq 2^K$;

remove all points in H; // hash shrinking     insert $p$ into H;

METHOD AND APPARATUS FOR CONSTRUCTING A 3D GEOMETRY

INCORPORATION BY REFERENCE

This present application claims the benefit of priority to U.S. Provisional Application No. 63/157,519, "UPDATES ON HASH SHRINKING FOR POINT CLOUD CODING," filed on Mar. 5, 2021, which is incorporated by reference herein in its entirety.

TECHNICAL FIELD

The present disclosure describes embodiments generally related to point cloud coding (PCC), including hash shrinking methods.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Point clouds have been widely used in recent years. For example, a point cloud can be used in autonomous driving vehicles for object detection and localization, geographic information systems (GIS) for mapping, and cultural heritages for visualizing and archiving cultural heritage objects and collections, and the like.

SUMMARY

Aspects of the disclosure provide apparatuses for point cloud compression. An apparatus includes processing circuitry that encodes information associated with a current point of a plurality of points of a point cloud. The plurality of points is partitioned into multiple bounding boxes. The processing circuitry determines whether a first size of a hash table is greater than or equal to a predetermined maximum size of the hash table. The processing circuitry removes information associated with non-boundary points in the multiple bounding boxes from the hash table based on the first size of the hash table being greater than or equal to the predetermined maximum size of the hash table. The processing circuitry stores the encoded information associated with the current point into the hash table.

In an embodiment, the processing circuitry determines whether a check point of the current point is equal to a saved check point. The check point of the current point is generated based on a boundary size of each of the multiple bounding boxes and a position of the current point. The processing circuitry removes the information associated with the non-boundary points in the multiple bounding boxes from the hash table based on the check point of the current point not being equal to the saved check point. The processing circuitry modifies the saved check point based on the check point of the current point.

In an embodiment, the processing circuitry determines whether a second size of the hash table is greater than or equal to the predetermined maximum size of the hash table. The processing circuitry removes information associated with all remaining points in the multiple bounding boxes from the hash table based on the second size of the hash table being greater than or equal to the predetermined maximum size of the hash table.

In an embodiment, the processing circuitry removes information associated with all remaining points in the multiple bounding boxes from the hash table.

In an embodiment, the processing circuitry encodes at least one of the predetermined maximum size of the hash table or a boundary size of each of the multiple bounding boxes into a bitstream.

In an embodiment, the processing circuitry encodes a mode index into a bitstream, the mode index indicating one of plurality of hash table shrinking modes.

In an embodiment, the processing circuitry encodes at least one of the predetermined maximum size of the hash table or a boundary size of each of the multiple bounding boxes based on the mode index.

In an embodiment, the information associated with the current point includes one of geometry information or attribute information associated with the current block.

Aspects of the disclosure provide methods for point cloud compression. The methods can perform any one or a combination of the processes performed by the apparatuses for the point cloud compression. In the method, information associated with a current point of a plurality of points of a point cloud is encoded. The plurality of points is partitioned into multiple bounding boxes. Whether a first size of a hash table is greater than or equal to a predetermined maximum size of the hash table is determined. Information associated with non-boundary points in the multiple bounding boxes is removed from the hash table based on the first size of the hash table being greater than or equal to the predetermined maximum size of the hash table. The encoded information associated with the current point is stored into the hash table.

Aspects of the disclosure also provide non-transitory computer-readable mediums storing instructions which when executed by at least one processor cause the at least one processor to perform any one or a combination of the methods for point cloud compression.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Point Cloud Compression

A point cloud can contain a set of high dimensional points such as three dimensional (3D) points. Each 3D point can include 3D position information and additional attributes such as color, reflectance, and the like. The information can be captured using multiple cameras and depth sensors, or Lidar in various setups, and may be made up of thousands or even billions of points to realistically represent the original scenes.

Compression technologies are needed to reduce an amount of data required to represent a point cloud for a faster transmission or a reduction of storage. International Organization for Standardization/International Electrotechnical Commission (ISO/IEC) Moving Picture Experts Group (MPEG) has created an ad-hoc group (MPEG-PCC) to standardize the compression techniques for static or dynamic clouds.

In some related examples such as the test model 13 (TMC13) in MPEG, the geometry information and the associated attributes, such as color or reflectance information, are separately compressed. The geometry information, which is the 3D coordinates of the point clouds, is coded by using an octree-partition with the associated occupancy information. The attributes are then compressed based on reconstructed geometry using a separate attribute coding technique such as a prediction based attribute coding technique, a lifting based attribute coding technique, or a region adaptive hierarchical transform (RAHT) based attribute coding technique.

In the following discussion, only one level of detail (LoD) is used as an example in a representation of the point cloud.

In the prediction based attribute coding, $(P_i)_{i=1\ldots N}$ is a set of positions associated with the points in the point cloud and $(M_i)_{i=1\ldots N}$ is the Morton codes associated with $(P_i)_{i=1\ldots N}$. First, the points are sorted according to the associated Morton codes in an ascending order. Let I be an array of point indexes ordered according to this process. The encoder (or decoder) compresses (or decompresses) the respective points according to the order defined by I. At each iteration i, a point $P_i$ is selected. The distances of $P_i$ to s (e.g., s=64) previous points are analyzed and k (e.g., k=3) nearest neighbors of $P_i$ are selected to be used for prediction. More precisely, the attribute values $(a_i)_{i \in 0 \ldots k-1}$ are predicted by using a linear interpolation process based on the distances of the nearest neighbours of point i. Let $\aleph_i$ be the set of the k-nearest neighbours of a current point i, and let $(\tilde{a}_j)_{j \in \aleph_i}$ be the decoded (or reconstructed) attribute) values and $(\delta_j)_{j \in \aleph_i}$ be the distances to the current point. The predicted attribute value $\hat{a}_i$ is given by:

$$\hat{a}_i = \text{Round}\left(\frac{1}{k}\sum_{j\in N_i} \frac{\frac{1}{\delta_j^2}}{\sum_{j\in N_i} \frac{1}{\delta_j^2}} \tilde{a}_j\right) \quad \text{(Eq. 1)}$$

Figure 1:
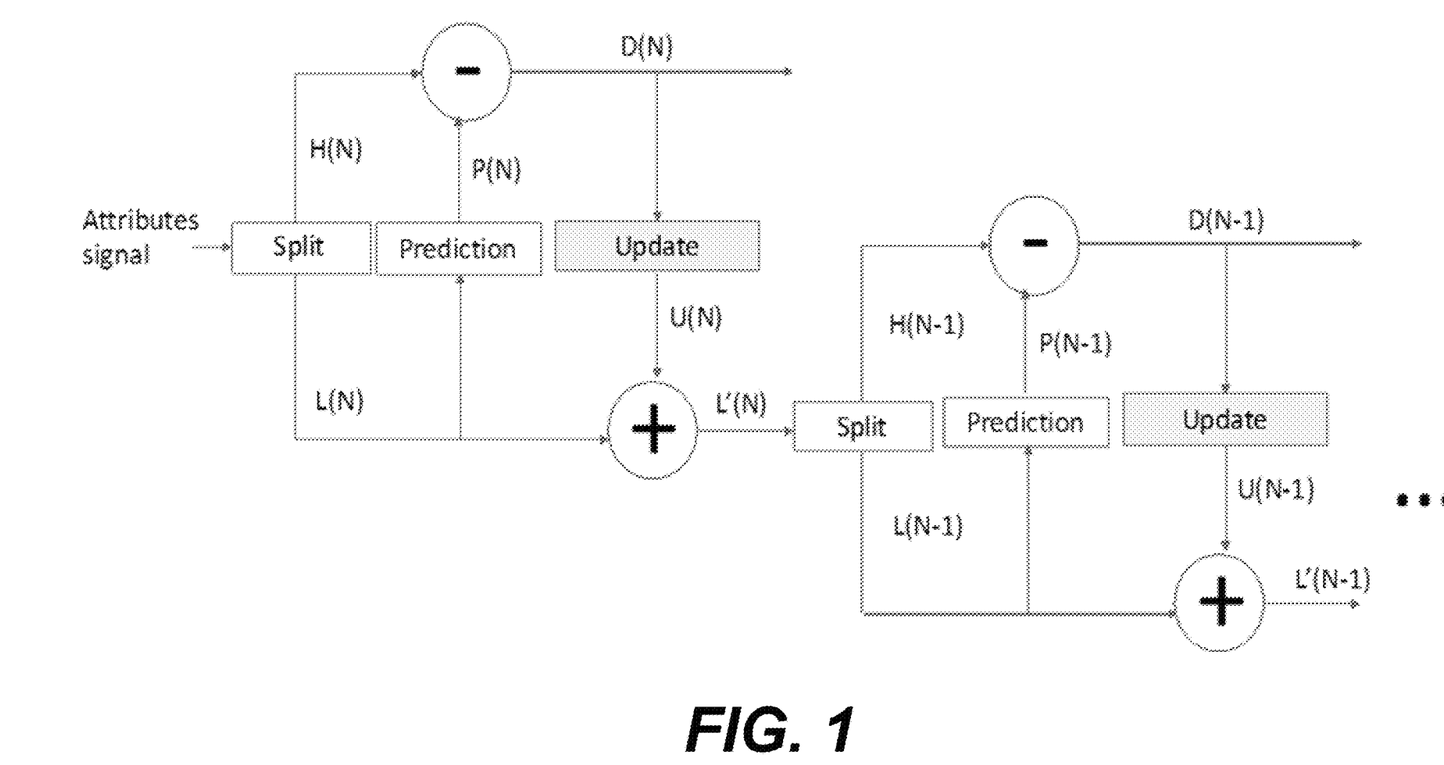
FIG. 1 shows an exemplary forward transform in a lifting based attribute coding according to an embodiment of the disclosure.
Figure 2:
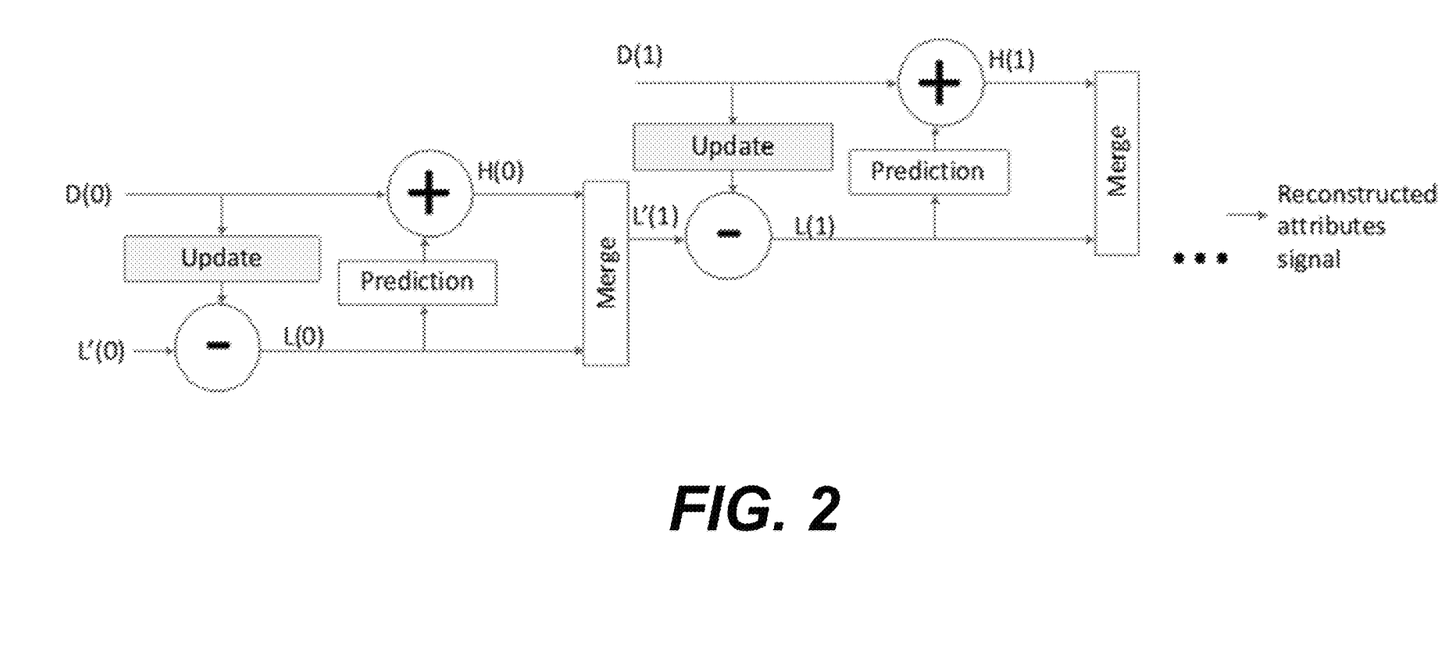
FIG. 2 shows an exemplary inverse transform in the lifting based attribute coding according to an embodiment of the disclosure.

The lifting based attribute coding is based on the prediction-based attribute coding. The main difference compared with the prediction based attribute coding is that two additional steps are introduced in the lifting based attribute coding. The first step is to introduce an update operator and the second step is to use an adaptive quantization strategy. FIG. 1 and FIG. 2 show an exemplary forward transform and an exemplary inverse transform, respectively, in the lifting based attribute coding according to an embodiment of the disclosure.

Figure 3A:
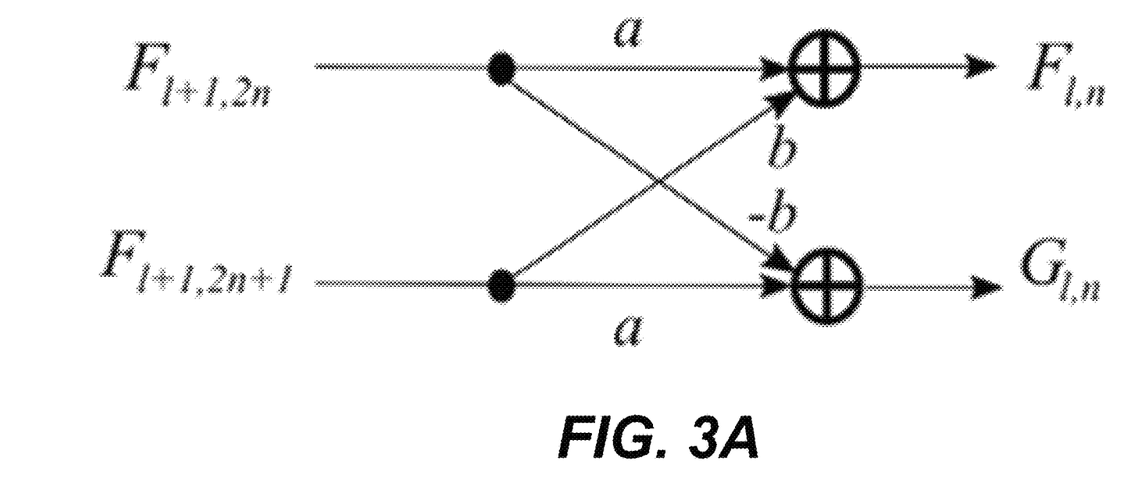
FIG. 3A shows an exemplary forward transform in a region adaptive hierarchical transform based attribute coding according to an embodiment of the disclosure.
Figure 3B:
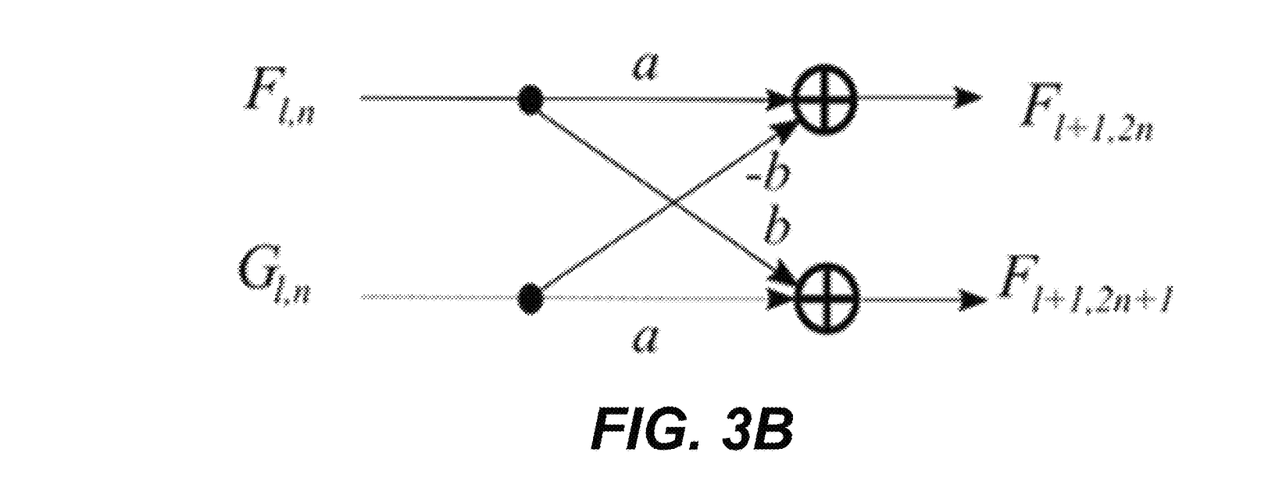
FIG. 3B shows an exemplary inverse transform in a region adaptive hierarchical transform based attribute coding according to an embodiment of the disclosure.

FIG. 3A and FIG. 3B show an exemplary forward transform and an exemplary inverse transform, respectively, in the RAHT based attribute coding according to an embodiment of the disclosure. In FIGS. 3A-3B, $$a^2 = \frac{w_0}{w_0 + w_1} \text{ and } b^2 = \frac{w_1}{w_0 + w_1},$$

and $w_0$ is the notation of the weight of the input coefficient $F_{l+1,2n}$ while $w_1$ is the same for $F_{l+1,2n+1}$.

II. Hash Based Compression for Point Cloud

According to aspects of the disclosure, a hash based neighboring information accessing method can be used for geometry coding and attribute coding in the point cloud compression.

The coded geometry (or attribute) information can be saved in a hash table and retrieved as predictors for later coded nodes. The hash table can be used to store reconstructed geometry (or attribute) values. For example, a hash table H is maintained, where a key of the hash table can be a Morton code of 3D coordinates of a point, i.e., $M_i$=Morton $(x_i, y_i, z_i)$, where $(x_i, y_i, z_i)$ are the 3D coordinates of the $i^{th}$ point. Using the Morton code $M_i$ as the key, a reconstructed geometry (or attribute) value can be accessed in the hash table H directly. If $H(M_i)$ is NULL, it indicates that the position $(x_i, y_i, z_i)$ is not occupied and there is no geometry (or attribute) value associated with the position $(x_i, y_i, z_i)$ or the geometry (or attribute) value associated with the position $(x_i, y_i, z_i)$ is not coded yet.

When encoding (or decoding) the geometry (or attribute) value of a current point, the previously coded geometry (or attribute) values of neighboring points of the current point can be obtained from the hash table H, and used as predictors of the current point. After encoding (or decoding) the geometry (or attribute) value of the current point, the reconstructed geometry (or attribute) value of the current point are then stored in the hash table H.

According to aspects of the disclosure, a size of the hash table can be reduced based on a hash shrinking technique. The hash shrinking technique can be use if the size of the hash table exceeds a maximum size of the hash table. Since the points of the point cloud can be partitioned into multiple bounding boxes, in order to shrink the hash table size while keeping the coding efficiency, certain points can be removed. In one method all points that are not at boundaries of the multiple bounding boxes of the point cloud can be removed and the boundary points kept.

In some embodiments, a number of boundary points can be allowed to exceed the maximum hash table size under one or more conditions. For example, if the point cloud has a dense distribution in geometry (e.g., the points in the point cloud are densely distributed), the number of the boundary points can be larger than the maximum hash table size. In this case, the maximum hash table size can be a soft threshold instead of a hard threshold, because the actual size of the hash table can exceed the maximum hash table size.

This disclosure includes hash shrinking strategies to further reduce the actual hash table size. Some shrinking strategies can introduce losses in coding efficiency. It is noted that the hash shrinking strategies can be applied to one of or both geometry coding and attribute coding in the PCC applications.

It is noted that the hash shrinking strategies are not limited to the TMC13 software or PCC in MPEG or PCC in audio video coding standard (AVS). The hash shrinking strategies can be general solutions for PCC systems.

In some embodiments, at least one parameter can be introduced in the hash shrinking methods. A first parameter can be the maximum hash table size, and a second parameter can be a boundary size of each of the multiple bounding boxes of the point cloud. The maximum hash table size can be defined in log 2 scale. For example, a parameter K defines that the maximum size of hash table as $2^K$. The boundary size can be also defined in log 2 scale. For example, M defines a bounding box of ($2^M$, $2^M$, $2^M$) in a 3D space. It is noted that these two parameters can be either fixed for all cases or can be configured differently case by case and sent in a bitstream as a part of high-level syntax, such as sequence parameter set, geometry parameter set, slice header, or the like. When the hash table reaches the maximum capacity, the hash table can be shrunk by removing some or all elements in the hash table. The rules regarding which elements are to be removed may differ in different situations.

According to aspects of the disclosure, elements storing information of the non-boundary points in the point cloud can be removed from the hash table when the hash table reaches the maximum capacity.

Figure 4:
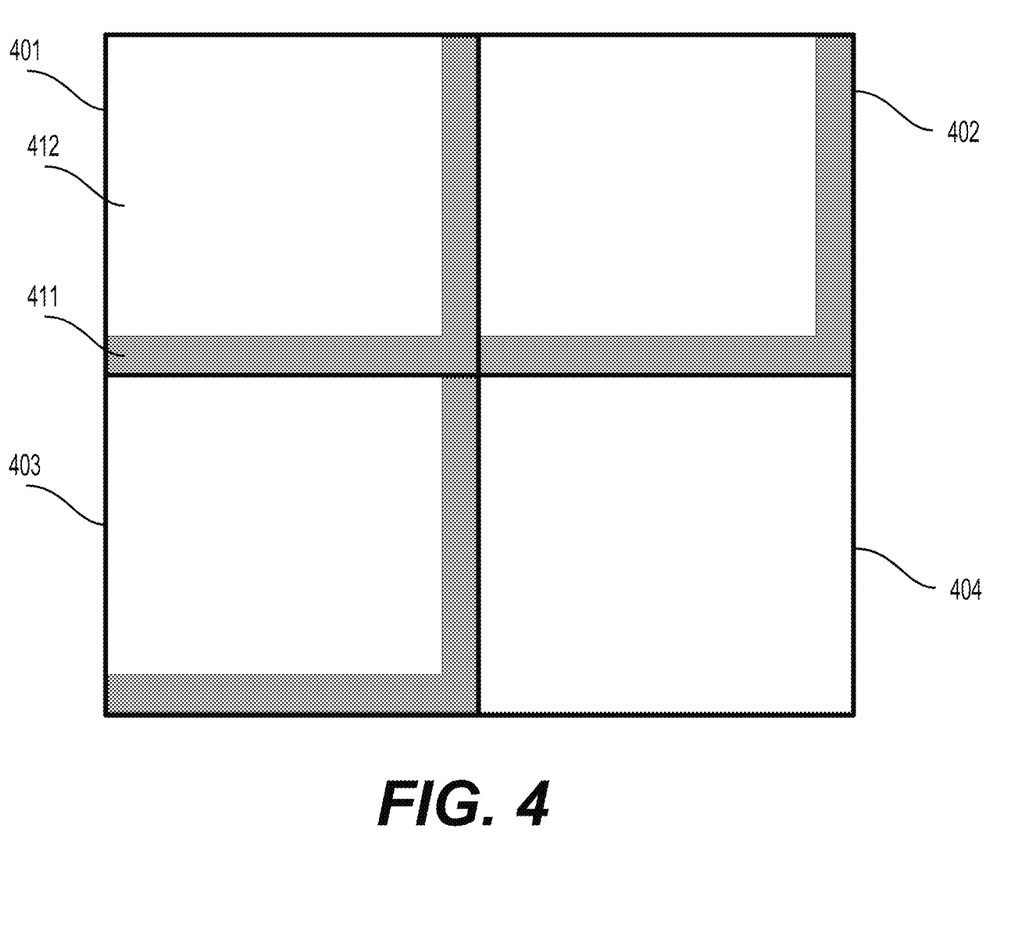
FIG. 4 shows an exemplary two-dimensional illustration of bounding boxes according to an embodiment of the disclosure.

FIG. 4 shows an exemplary two-dimensional illustration of bounding boxes (401)-(404) according to an embodiment of the disclosure, in which the bounding boxes (401)-(403) are encoded while the bounding box (404) is not encoded yet. In each bounding box, a shaded area represents the boundary points. For example, the shaded area (411) represents the boundary points of the bounding box (401) and the area (412) represents the non-boundary points of the bounding box (401). It is noted that the boundary points are not limited to be located at the bottom side and/or right side of the two-dimensional representation of the bounding box. In other cases, the boundary points can be located at one or more other combinations of sides, such as the left side and/or top side of the two-dimensional representation of the bounding box.

Figure 5:
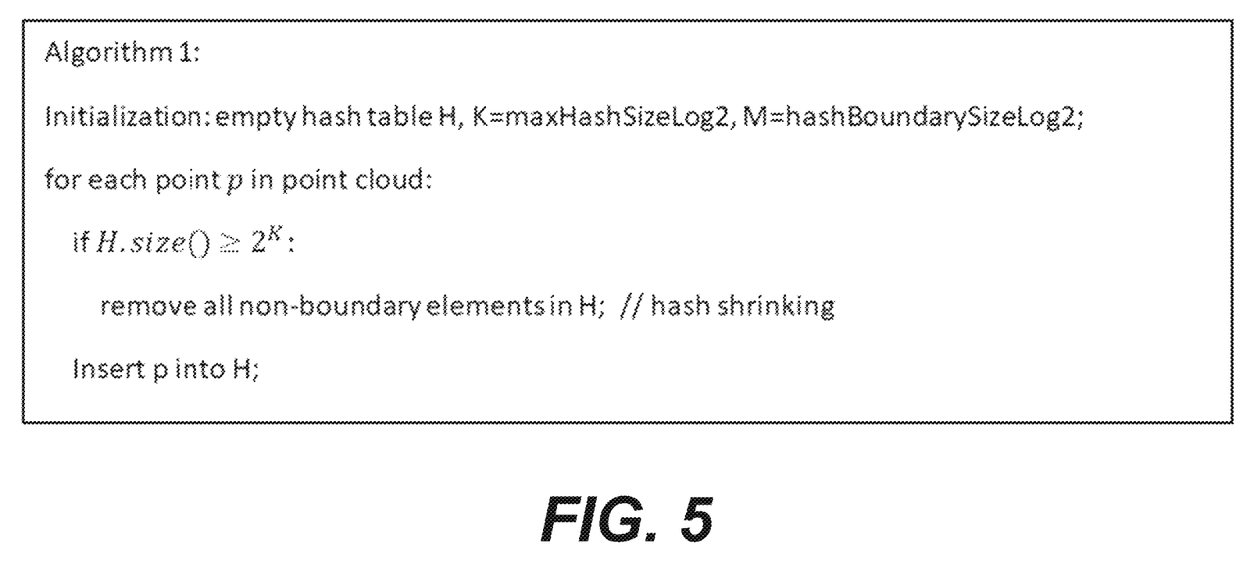
FIG. 5 shows an exemplary hash shrinking algorithm according to an embodiment of the disclosure.

FIG. 5 shows a hash shrinking algorithm according to an embodiment of the disclosure. In this hash shrinking algorithm, the elements in the hash table that store the information of the non-boundary points of the bounding boxes are removed from the hash table. For example, if each bounding box has a size of ($2^M$, $2^M$, $2^M$) in the 3D space, at least one position coordinate of a boundary point is equal to $2^{i*M}-1$ (i=1,2,3, ... ). In this embodiment, all the hash elements that store the information of boundary points are kept and the remaining elements can be deleted from the hash table.

Figure 6:
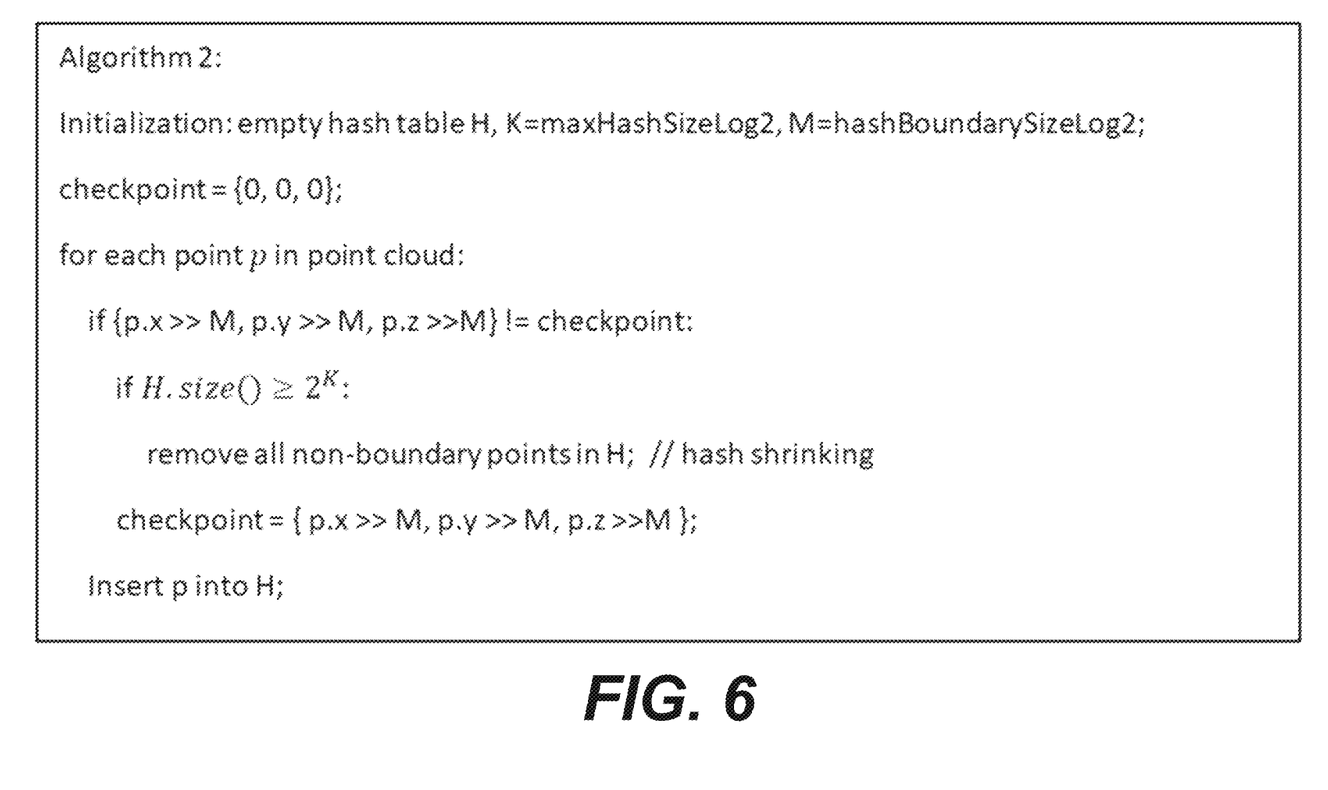
FIG. 6 shows another exemplary hash shrinking algorithm according to an embodiment of the disclosure.

FIG. 6 shows another hash shrinking algorithm according to an embodiment of the disclosure. In this hash shrinking algorithm, to limit the coding efficiency loss, the shrinking operation can only be applied when a current point p reaches a new bounding box. For example, it is assumed that the points in the input point cloud are sorted by a certain order, such as Morton order. A checkpoint can be used to examine whether the current point p reaches the new bounding box.

The coordinates of a checkpoint of the current point p can be defined as (p.x>>M, p.y>>M, p.z>>M), where $2^M$ is the boundary size. If the checkpoint of the current point p differs from a saved checkpoint, it indicates the current point reaches the new bounding box that does not include the saved checkpoint, and then the shrinking operation can be applied and the saved checkpoint can be updated as the checkpoint of the current point. Using FIG. 4 as an example, the initial checkpoint can be set as (0, 0, 0) in the bounding box (401), and M=4 so that the boundary size of each bounding box is 16. If the current point p is at (20, 20, 20), then the checkpoint of the current point p is (20>>4, 20>>4, 20>>4)=(1, 1, 1), which is different from the initial check point (0, 0, 0). It means that the current point p reaches the bounding box (402) and thus the shrinking operation can be applied if the size of the hash table exceeds the maximum hash table size.

Figure 7:
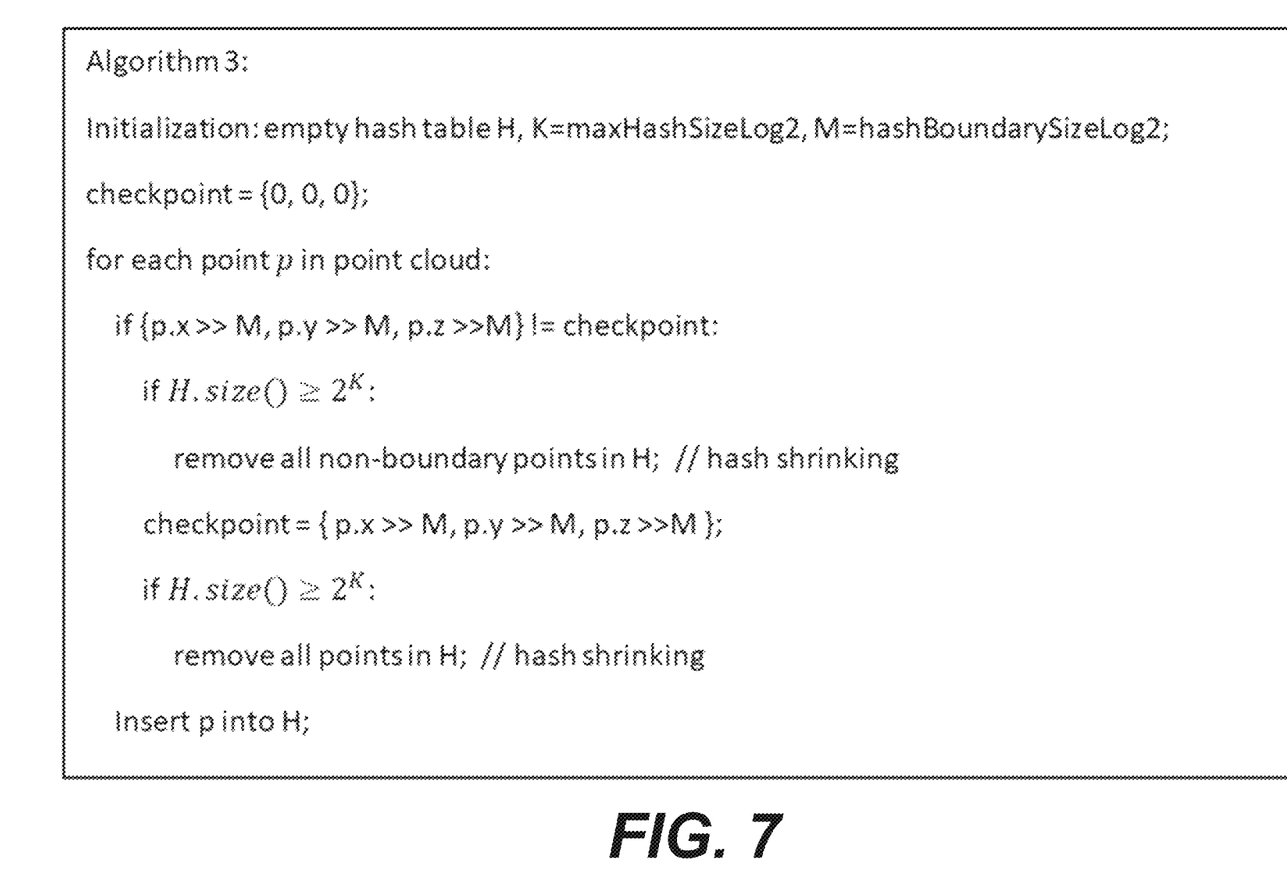
FIG. 7 shows another exemplary hash shrinking algorithm according to an embodiment of the disclosure.

FIG. 7 shows another shrinking algorithm according to an embodiment of the disclosure. In this shrinking algorithm, after shrinking the hash table by removing the non-boundary points as shown in FIG. 6, if the hash table size is still greater than a defined threshold (e.g., the maximum hash table size), additional points in the hash table can be removed. In an embodiment, all points in the hash table can be removed. In an embodiment, after shrinking the hash table by removing the non-boundary points as shown in FIG. 6, if the hash table size is still greater than the defined threshold, instead of removing all the points in the hash table, certain points can be removed based on a specific rule. For example, based on the specific rule, points that are added first to the hash table can be removed, points with smaller Morton codes in the hash table can be removed, or the like.

Figure 8:
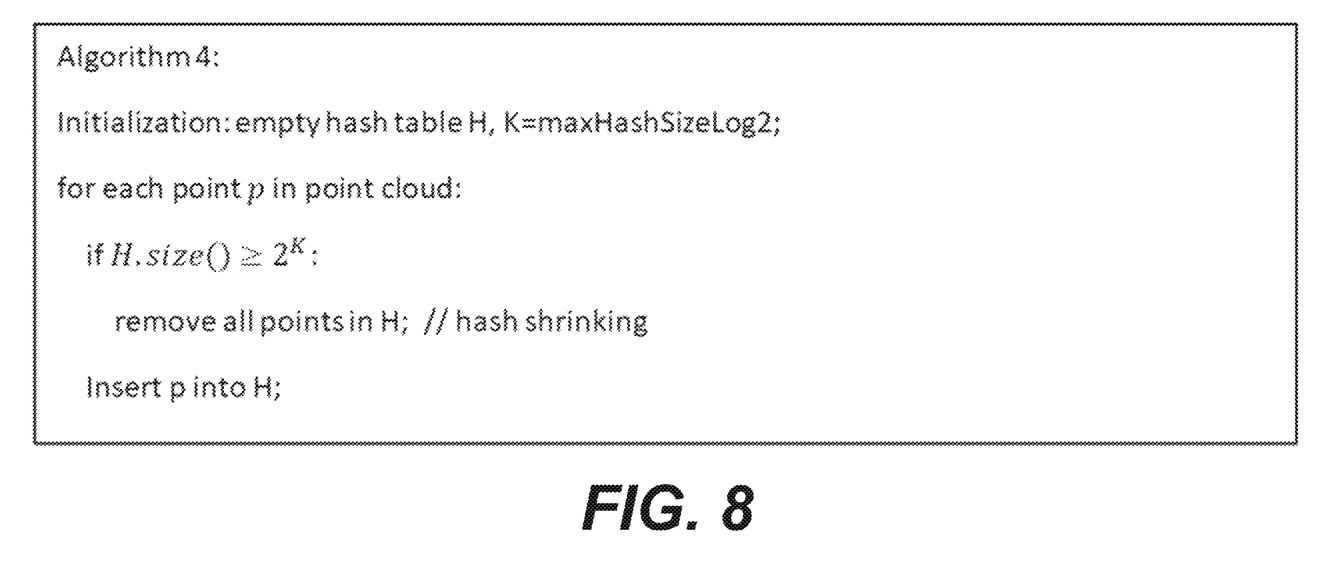
FIG. 8 shows another exemplary hash shrinking algorithm according to an embodiment of the disclosure.

FIG. 8 shows another shrinking algorithm according to an embodiment of the disclosure. In this shrinking algorithm, the maximum hash size defined by K is a hard threshold. That is, once the hash table size exceeds the hard threshold, the hash table can be emptied. In an embodiment, the hash table is emptied by removing all points. In this case, the boundary size M can be omitted, since the shrinking condition is no longer dependent on the boundary size M.

In some embodiments, the predefined parameters in the hash shrinking algorithms, such as K=maxHashSizeLog2 and M=hashBoundarySizeLog2, can be signaled. The predefined parameters can be signaled in the high-level syntax in some embodiments. In addition, a shrinking mode index can be signaled to switch between different shrinking strategies. For example, these parameters can be specified in a sequence header, a slice header, a geometry parameter set (GPS), or an attribute parameter set (APS) of a bitstream. Since these shrinking strategies can be used for both the geometry coding and the attribute coding, the parameters can be configured differently for the geometry coding and the attribute coding. Therefore, two sets of parameters can be signaled in the GPS and the APS, respectively.

In one embodiment, the K and M are signaled for the geometry coding in the GPS, as shown in Table 1. The syntax element gps_hash_max_size_log 2 defines the maximum hash table size in log 2, i.e., K=gps_hash_max_size_log 2, for the geometry coding. The syntax element gps_hash_boundary_size_log 2 defines the boundary size in log 2, i.e., M=gps_hash_boundary_size_log 2, for the geometry coding. The syntax element gps_hash_shrink_mode specifies different hash shrinking strategies for the geometry coding.

TABLE 1

| | Descriptor |
|---|---|
| geometry_parameter_set( ) { | |
| ... | ... |
|    gps_hash_shrink_mode | u(n) |
|    gps_hash_max_size_log2 | ue(v) |
|    gps_hash_boundary_size_log2 | ue(v) |
| ... | ... |
|    byte_alignment( ) | |
| } | |

In one embodiment, the K and M are signaled for the attribute coding in the APS, as shown in Table 2. The syntax element aps_hash_max_size_log 2 defines the maximum hash table size in log 2, i.e., K=aps_hash_max_size_log 2, for the attribute coding. The syntax element gps_hash_boundary_size_log 2 defines the boundary size in log 2, i.e., M=gps_hash_boundary_size_log 2, for the attribute coding. The syntax element aps_hash_shrink_mode specifies different hash shrinking strategies for the attribute coding.

TABLE 2

| | Descriptor |
|---|---|
| attribute_parameter_set( ) { | |
| ... | ... |
|    aps_hash_shrink_mode | u(n) |
|    aps_hash_max_size_log2 | ue(v) |
|    aps_hash_boundary_size_log2 | ue(v) |
| ... | ... |
|    byte_alignment( ) | |
| } | |

In some embodiments, different shrinking strategies can have different sets of parameters. Table 3 shows the different set of parameters in the APS, while the same signaling method can be also applied in the GPS. The syntax elements aps_hash_mode0_param0 and aps_hash_mode0_param1 are example parameters when the syntax element aps_hash_shrink_mode is equal to 0. For example, the syntax elements aps_hash_mode0_param0 and aps_hash_mode0_param1 can be a first value of the maximum hash table size and a first value of the boundary size, respectively. The syntax elements aps_hash_mode1_param0 and aps_hash_mode1_param1 are exemplary parameters when the syntax element aps_hash_shrink_mode is equal to 1. For example, the syntax elements aps_hash_mode1_param0 and aps_hash_mode1_param1 can be a second value of the maximum hash table size and a second value of the boundary size, respectively.

TABLE 3

| | Descriptor |
|---|---|
| attribute_parameter_set( ) { | |
| ... | ... |
|    aps_hash_shrink_mode | u(n) |
|    if ( aps_hash_shrink_mode == 0 ) { | |
|       aps_hash_mode0_param0 | ue(v) |
|       aps_hash_mode0_param1 | ue(v) |
|       ... | ... |
|    } | |
|    else if ( aps_hash_shrink_mode == 1 ) { | |
|       aps_hash_mode1_param0 | ue(v) |
|       aps_hash_mode1_param1 | ue(v) |
|       ... | ... |
|    } | |

TABLE 3-continued

| | Descriptor |
|---|---|
| ... | ... |
|    byte_alignment( ) | |
| } | |

III. Flowchart

Figure 9:
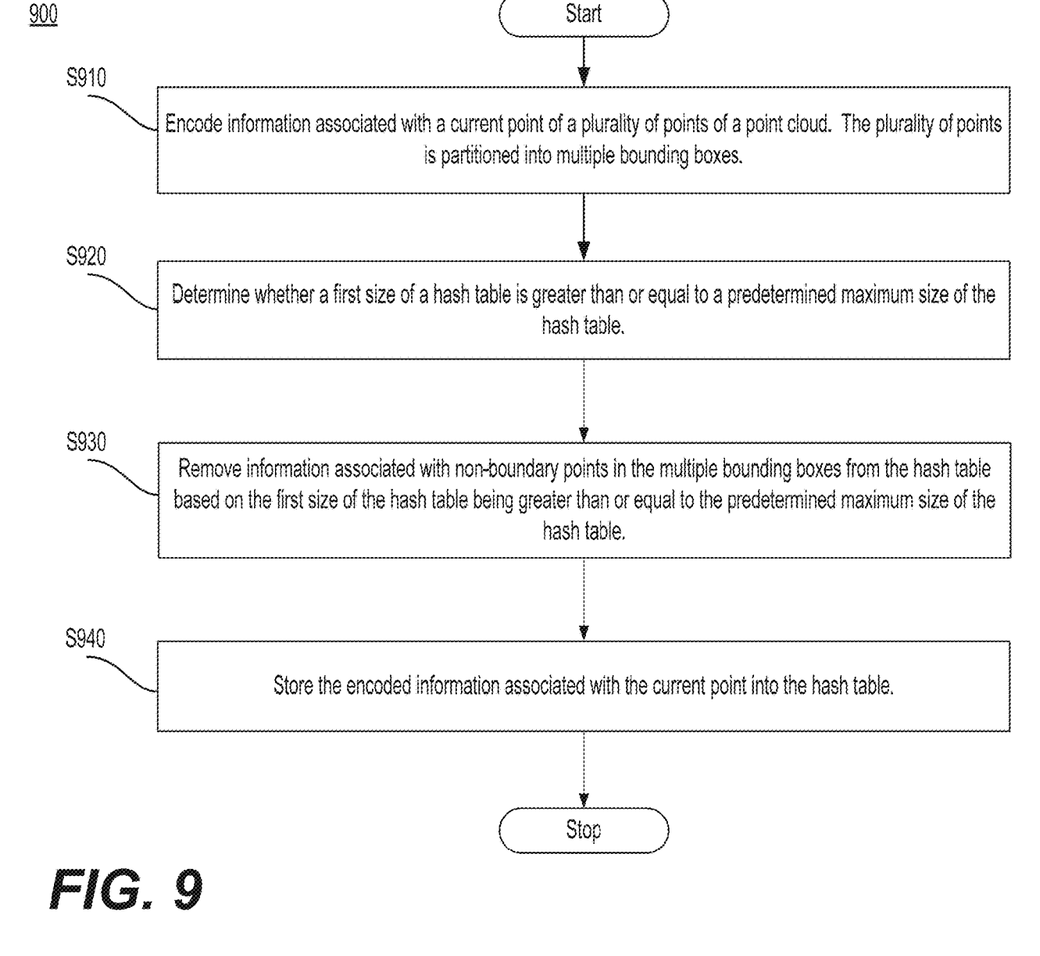
FIG. 9 shows an exemplary flowchart according to an embodiment of the disclosure.

FIG. 9 shows a flow chart outlining an exemplary process (900) according to an embodiment of the disclosure. In various embodiments, the process (900) is executed by processing circuitry, such as the processing circuitry shown in FIG. 11. In some embodiments, the process (900) is implemented in software instructions, thus when the processing circuitry executes the software instructions, the processing circuitry performs the process (900).

The process (900) may generally start at step (S910), where the process (900) encodes information associated with a current point of a plurality of points of a point cloud. The plurality of points is partitioned into multiple bounding boxes. Then, the process (900) proceeds to step (S920).

At step (S920), the process (900) determines whether a first size of a hash table is greater than or equal to a predetermined maximum size of the hash table. Then, the process (900) proceeds to step (S930).

At step (S930), the process (900) removes information associated with non-boundary points in the multiple bounding boxes from the hash table based on the first size of the hash table being greater than or equal to the predetermined maximum size of the hash table. Then, the process (900) proceeds to step (S940).

At step (S940), the process (900) stores the encoded information associated with the current point into the hash table. Then, the process (900) terminates.

In an embodiment, the process (900) determines whether a check point of the current point is equal to a saved check point. The check point of the current point is determined based on a boundary size of each of the multiple bounding boxes. The process (900) removes the information associated with the non-boundary points in the multiple bounding boxes from the hash table based on the check point of the current point not being equal to the saved check point. The process (900) modifies the saved check point based on the check point of the current point.

In an embodiment, the process (900) determines whether a second size of the hash table is greater than or equal to the predetermined maximum size of the hash table. The process (900) removes information associated with all remaining points in the multiple bounding boxes from the hash table based on the second size of the hash table being greater than or equal to the predetermined maximum size of the hash table.

In an embodiment, the process (900) removes information associated with all remaining points in the multiple bounding boxes from the hash table.

In an embodiment, the process (900) encodes at least one of the predetermined maximum size of the hash table or a boundary size of each of the multiple bounding boxes into a bitstream.

In an embodiment, the process (900) encodes a mode index into a bitstream, the mode index indicating one of plurality of hash table shrinking modes.

In an embodiment, the process (900) encodes at least one of the predetermined maximum size of the hash table or a boundary size of each of the multiple bounding boxes based on the mode index.

In an embodiment, the information associated with the current point includes one of geometry information or attribute information associated with the current block.

Figure 10:
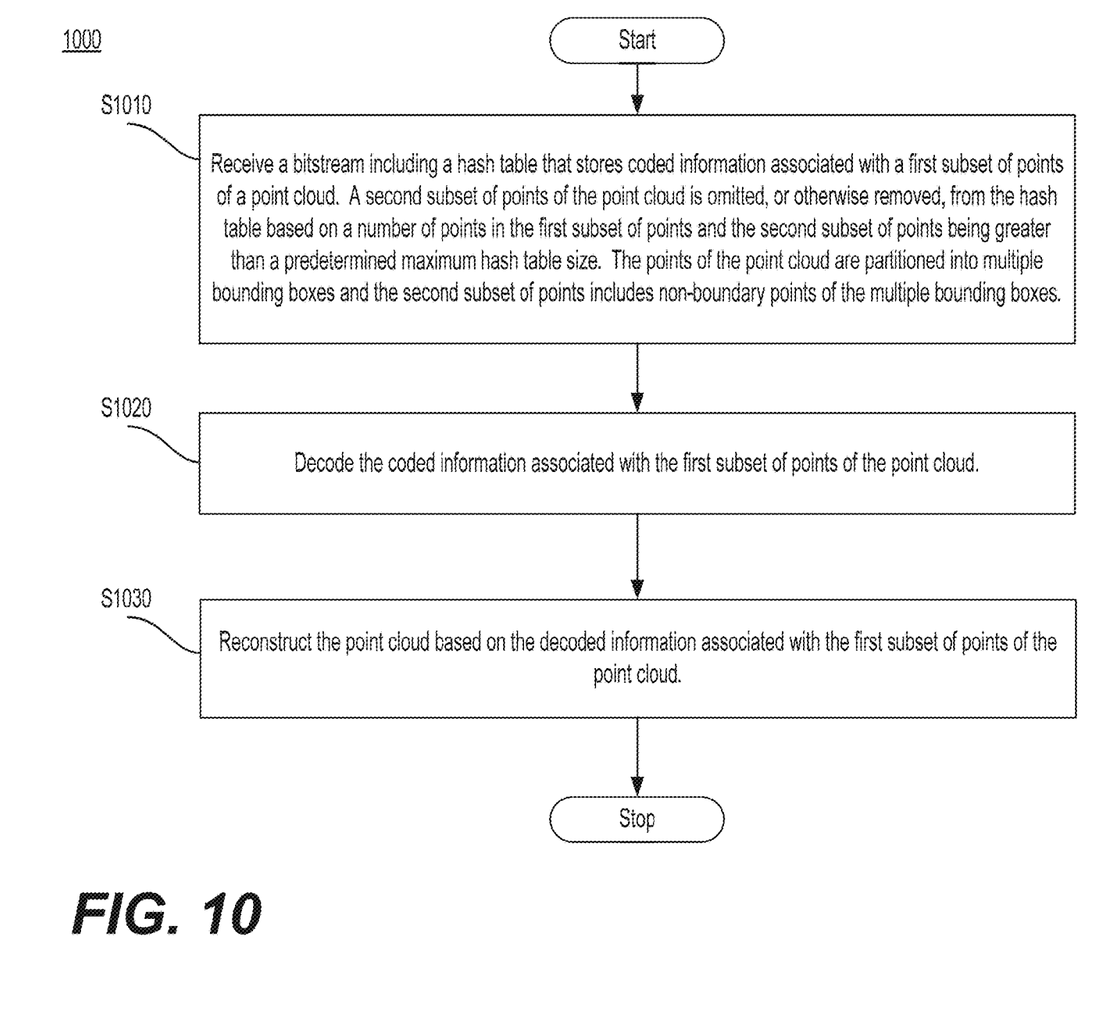
FIG. 10 shows another exemplary flowchart according to an embodiment of the disclosure.

FIG. 10 shows another flow chart outlining an exemplary process (1000) according to an embodiment of the disclosure. In various embodiments, the process (1000) is executed by processing circuitry, such as the processing circuitry shown in FIG. 11. In some embodiments, the process (1000) is implemented in software instructions, thus when the processing circuitry executes the software instructions, the processing circuitry performs the process (1000).

The process (1000) may generally start at step (S1010), where the process (1000) receives a bitstream including a hash table that stores coded information associated with a first subset of points of a point cloud. A second subset of points of the point cloud is omitted, or otherwise removed, from the hash table based on a number of points in the first subset of points and the second subset of points being greater than a predetermined maximum hash table size. The points of the point cloud are partitioned into multiple bounding boxes and the second subset of points includes non-boundary points of the multiple bounding boxes. Then, the process (1000) proceeds to step (S1020).

At step (S1020), the process (1000) decodes the coded information associated with the first subset of points of the point cloud. Then, the process (1000) proceeds to step (S1030).

At step (S1030), the process (1000) reconstructs the point cloud based on the decoded information associated with the first subset of points of the point cloud. Then, the process (1000) terminates.

IV. Computer System

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
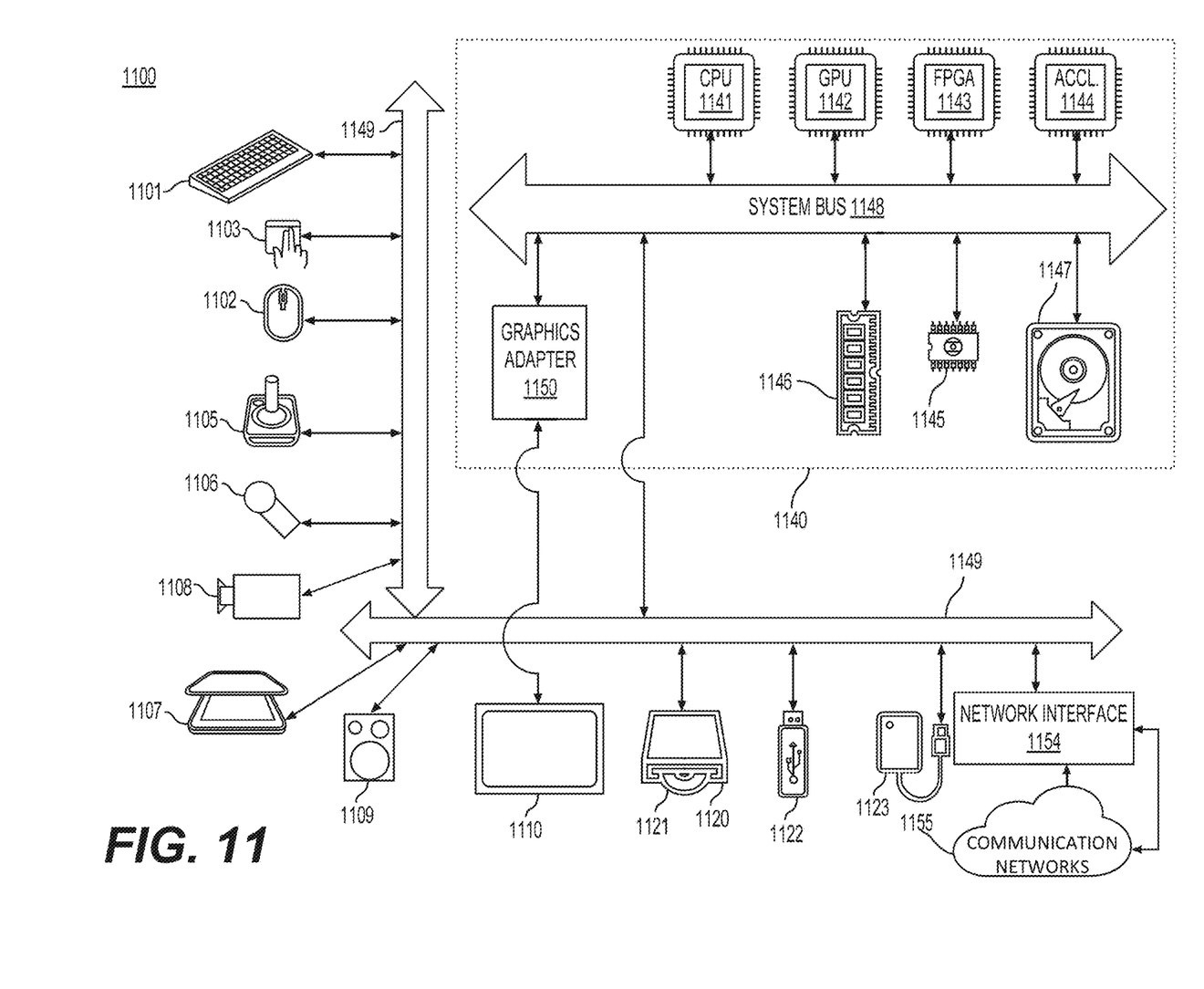
FIG. 11 is a schematic illustration of a computer system according to an embodiment of the disclosure.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), and camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1110)) can be connected to a system bus (1148) through a graphics adapter (1150).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include a network interface (1154) to one or more communication networks (1155). The one or more communication networks (1155) can for example be wireless, wireline, optical. The one or more communication networks (1155) can further be local, wide-area, metropolitan, vehicular and industrial, real-time, delay-tolerant, and so on. Examples of the one or more communication networks (1155) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage (1147) such as internal non-user accessible hard drives, SSDs, and the like, may be connected through the system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for point cloud compression, comprising:
encoding information associated with a current point of a plurality of points of a point cloud, the plurality of points being partitioned into multiple bounding boxes;
determining whether a first size of a hash table is greater than or equal to a predetermined maximum size of the hash table;
removing information associated with non-boundary points in the multiple bounding boxes from the hash table based on the first size of the hash table being greater than or equal to the predetermined maximum size of the hash table; and
storing the encoded information associated with the current point into the hash table.

2. The method of claim 1, wherein the removing comprises:
determining whether a check point of the current point is equal to a saved check point, the check point of the current point being generated based on a boundary size of each of the multiple bounding boxes and a position of the current point;
removing the information associated with the non-boundary points in the multiple bounding boxes from the hash table based on the check point of the current point being different from the saved check point; and
modifying the saved check point based on the check point of the current point.

3. The method of claim 2, further comprising:
determining whether a second size of the hash table is greater than or equal to the predetermined maximum size of the hash table; and
removing information associated with all remaining points in the multiple bounding boxes from the hash table based on the second size of the hash table being greater than or equal to the predetermined maximum size of the hash table.

4. The method of claim 1, further comprising:
removing information associated with all remaining points in the multiple bounding boxes from the hash table.

5. The method of claim 1, further comprising:
encoding at least one of the predetermined maximum size of the hash table or a boundary size of each of the multiple bounding boxes into a bitstream.

6. The method of claim 1, further comprising:
encoding a mode index into a bitstream, the mode index indicating one of plurality of hash table shrinking modes.

7. The method of claim 6, further comprising:
encoding at least one of the predetermined maximum size of the hash table or a boundary size of each of the multiple bounding boxes based on the mode index.

8. The method of claim 1, wherein the information associated with the current point includes one of geometry information or attribute information associated with the current point.

9. An apparatus, comprising:
processing circuitry configured to:
encode information associated with a current point of a plurality of points of a point cloud, the plurality of points being partitioned into multiple bounding boxes;
determine whether a first size of a hash table is greater than or equal to a predetermined maximum size of the hash table;
remove information associated with non-boundary points in the multiple bounding boxes from the hash table based on the first size of the hash table being greater than or equal to the predetermined maximum size of the hash table; and
store the encoded information associated with the current point into the hash table.

10. The apparatus of claim 9, wherein the processing circuitry is configured to:
determine whether a check point of the current point is equal to a saved check point, the check point of the current point being generated based on a boundary size of each of the multiple bounding boxes and a position of the current point;
remove the information associated with the non-boundary points in the multiple bounding boxes from the hash table based on the check point of the current point being different from the saved check point; and
modify the saved check point based on the check point of the current point.

11. The apparatus of claim 10, wherein the processing circuitry is configured to:
determine whether a second size of the hash table is greater than or equal to the predetermined maximum size of the hash table; and
remove information associated with all remaining points in the multiple bounding boxes from the hash table based on the second size of the hash table being greater than or equal to the predetermined maximum size of the hash table.

12. The apparatus of claim 9, wherein the processing circuitry is configured to:
remove information associated with all remaining points in the multiple bounding boxes from the hash table.

13. The apparatus of claim 9, wherein the processing circuitry is configured to:
encode at least one of the predetermined maximum size of the hash table or a boundary size of each of the multiple bounding boxes into a bitstream.

14. The apparatus of claim 9, wherein the processing circuitry is configured to:
encode a mode index into a bitstream, the mode index indicating one of plurality of hash table shrinking modes.

15. The apparatus of claim 14, wherein the processing circuitry is configured to:
encode at least one of the predetermined maximum size of the hash table or a boundary size of each of the multiple bounding boxes based on the mode index.

16. The apparatus of claim 9, wherein the information associated with the current point includes one of geometry information or attribute information associated with the current point.

17. A non-transitory computer-readable storage medium storing instructions which, when executed by at least one processor, cause the at least one processor to perform:
encoding information associated with a current point of a plurality of points of a point cloud, the plurality of points being partitioned into multiple bounding boxes;
determining whether a first size of a hash table is greater than or equal to a predetermined maximum size of the hash table;
removing information associated with non-boundary points in the multiple bounding boxes from the hash table based on the first size of the hash table being greater than or equal to the predetermined maximum size of the hash table; and
storing the encoded information associated with the current point into the hash table.

18. The non-transitory computer-readable storage medium of claim 17, wherein the removing comprises:
determining whether a check point of the current point is equal to a saved check point, the check point of the current point being generated based on a boundary size of each of the multiple bounding boxes and a position of the current point;
removing the information associated with the non-boundary points in the multiple bounding boxes from the hash table based on the check point of the current point being different from the saved check point; and
modifying the saved check point based on the check point of the current point.

19. The non-transitory computer-readable storage medium of claim 18, wherein the stored instructions cause the at least one processor to perform:
determining whether a second size of the hash table is greater than or equal to the predetermined maximum size of the hash table; and
removing information associated with all remaining points in the multiple bounding boxes from the hash table based on the second size of the hash table being greater than or equal to the predetermined maximum size of the hash table.

20. The non-transitory computer-readable storage medium of claim 17, wherein the stored instructions cause the at least one processor to perform:
removing information associated with all remaining points in the multiple bounding boxes from the hash table.

* * * * *